United States Patent

Imamura et al.

[11] Patent Number: 6,131,504
[45] Date of Patent: Oct. 17, 2000

[54] BOILING POT

[75] Inventors: Katsuhiko Imamura; Kazuhiko Imamura, both of Fukuoka, Japan

[73] Assignee: Yuugengaisya Yahimeshouji, Fukuoka, Japan

[21] Appl. No.: 09/367,812

[22] PCT Filed: Dec. 22, 1998

[86] PCT No.: PCT/JP98/05837

§ 371 Date: Aug. 23, 1999

§ 102(e) Date: Aug. 23, 1999

[87] PCT Pub. No.: WO99/31998

PCT Pub. Date: Jul. 1, 1999

[30] Foreign Application Priority Data

Dec. 22, 1997 [JP] Japan ................................. 9-365606

[51] Int. Cl.[7] ................................. A23L 1/20; A47J 27/16
[52] U.S. Cl. ................................. 99/330; 99/355; 99/403; 99/470; 99/516; 99/483; 99/485; 99/453
[58] Field of Search ................................. 99/330, 352–355, 99/403–418, 483–485, 516, 452–455; 126/246, 369, 400; 219/401; 422/26, 292, 295, 297, 300, 302, 304, 307

[56] References Cited

U.S. PATENT DOCUMENTS

| | | | |
|---|---|---|---|
| 4,771,681 | 9/1988 | Nagata | 99/453 X |
| 4,787,304 | 11/1988 | Bronnert | 99/516 X |
| 4,813,347 | 3/1989 | Yoshida | 99/483 |
| 4,816,516 | 3/1989 | Yomaya et al. | 99/484 X |
| 4,869,164 | 9/1989 | Takeyma | 99/330 X |
| 4,947,742 | 8/1990 | Nishibayashi | 99/453 X |
| 4,996,916 | 3/1991 | Miyawaki et al. | 99/483 X |
| 5,058,494 | 10/1991 | Hayashi et al. | 99/453 |
| 5,074,201 | 12/1991 | Takeyama et al. | 99/483 |
| 5,351,745 | 10/1994 | Park | 99/470 X |
| 5,363,753 | 11/1994 | Ueda et al. | 99/453 |
| 5,476,635 | 12/1995 | Stoker | 99/483 X |
| 5,947,008 | 9/1999 | Fullmer | 99/483 X |

FOREIGN PATENT DOCUMENTS

| | | |
|---|---|---|
| 62-262960 | 11/1987 | Japan . |
| 2-227039 | 9/1990 | Japan . |
| 6-237859 | 9/1990 | Japan . |
| 6-261706 | 9/1994 | Japan . |

OTHER PUBLICATIONS

Microfilm of the specification and drawings annexed to the request of Japanese Utility Model Application No. 60–180628, OK Food Industry Co., Ltd., Jun. 1987.

Primary Examiner—Timothy Simone
Attorney, Agent, or Firm—Young & Thompson

[57] ABSTRACT

The caldron of the invention comprises a cylindrical caldron main body having a raw material charge port for charging a water-added raw material to be boiled and a discharge port for discharging a boiled raw material, both ports being disposed near to both the closed ends of the caldron main body and at least one steam injection pipe installed in the caldron main body and having a plurality of injection ports for injecting steam and preferably oxygen-free streams for boiling the raw material, wherein the injecting direction of the steam injected from the injection ports is inclined so that the steam is supplied in the circumferential direction of the caldron main body. As a result, the caldron of the invention can prevent the water-added raw material to be boiled such as bean juice and the like from being unevenly boiled, eliminate the adverse affect caused by the steam remaining in the caldron main body, lower the pressure in the caldron main body, properly control the raw material fed in the caldron main body, uniformly and sufficiently transmit the heat of the steam to the raw material so that it is evenly and sufficiently heated, whereby the boiled raw material such as bean juice and the like is manufactured, from which soybean milk of high quality preferably containing no oxygen mixed therewith and dissolved therein can be manufactured.

18 Claims, 6 Drawing Sheets

BOILING POT

TECHNICAL FIELD

The present invention relates an apparatus for manufacturing bean juice ("go" (which is obtained by grinding soybeans immersed in water or thereafter by boiling ground soybeans) or "nigo" (which is boiled bean juice)) used as a raw material, from which soybean milk, soybean curd ("tofu") and membrane-like soybean curds ("yuba") are manufactured, boiled adzuki beans used as a raw material of powder bean jam and the like, and so forth. More particularly, the present invention relates to a caldron for manufacturing a boiled raw material such bean juice and boiled adzuki beans of high quality by heating a raw material, which is composed of beans such as ground soybeans obtained by grinding soybeans immersed in water, adzuki beans, ground adzuki beans and the like, mixtures of such ground bean materials with water or materials obtained by heating the mixtures, with steam injected thereto.

BACKGROUND ART

Heretofore, a bean-juice-manufacturing caldron used to the manufacture of soybean milk, a soybean curd and membrane like soybean curds comprises a cylindrical caldron main body having closed upper and lower ends, a charge port disposed at lower portion of the caldron main body for charging a raw material of bean juice such as ground soybeans to which water is added or the heated ones thereof, a discharge port disposed at upper portion of the caldron main body for discharging the raw material after it is processed in the caldron, and a steam injection pipe having a plurality of injection ports simply formed therethrough and installed in interior of the caldron main body.

Steam used in the conventional bean-juice-manufacturing caldron has been air-containing steam obtained by simply heating ordinary water.

In the conventional bean-juice-manufacturing caldron, the steam injected from the injection ports of the steam injection pipe are injected in a radial direction. The steam injected in the radial direction collides against the inner peripheral wall of the caldron main body and lose their motion energy so that the flow rate of the streams is reduced. Therefore, the steam having the reduced flow rate cannot sufficiently turn and flow into the space located backward of the injection ports in the caldron main body and the steam only move upward in the caldron main body. As a result, the steam is in good contact with the raw material of bean juice or the heated one thereof (hereinafter, they are referred to as raw material of bean juice as a whole) which is located in the vicinity of the radially injecting passages of the steam which are directed radially from the injection ports so that the raw material of bean juice located at the position is sufficiently heated with the heat of the steam. However, since the steam comes into contact with the raw material of bean juice in a small quantity which is located in the space backward of the injection ports of the caldron main body, the heat of the steam is not sufficiently transmitted to the raw material of bean juice located at the backward position. Thus, the raw material of bean juice cannot be heated with a necessary quantity of heat. As a result, there is caused thereby a problem that a part of the raw material of bean juice is sufficiently heated and the other part thereof is insufficiently heated, whereby the raw material of bean juice is unevenly boiled.

In the conventional bean-juice-manufacturing caldron, since steam cannot be uniformly and sufficiently supplied to the raw material of bean juice, the steam cannot sufficiently transmit their heat to the raw material of bean juice. Accordingly, a large quantity of the steam stays in the upper portion of the caldron main body while holding a sufficient quantity of heat at high temperature and increase the pressure of the upper portion of the caldron main body as residual steam. Thus, there arises a problem that the raw material of bean juice is pushed out into the discharge port of the caldron main body in a quantity larger than necessary, the feed of the raw material of bean juice in the caldron main body cannot be properly controlled, the raw material of bean juice has a portion to which the heat of the stream is transmitted well and which is sufficiently heated and a portion which is insufficiently heated, whereby the raw material of bean juice is unevenly boiled, bean juice of good quality cannot be produced and thus a soybean curd of good quality cannot be manufactured.

Incidentally, soybean milk obtained by separately a solid soybean curd lees ("okara") from a sufficiently heated bean juice (of high quality) not only promptly reacts to a coagulant or a curding agent but also is mixed therewith quickly as compared with the soybean milk obtained by separately the solid soybean curd lees from an insufficiently heated bean juice (of low quality). Therefore, when a curding agent such as magnesium chloride which is usually used as aqueous solution ("nigari") or the like is added to soybean milk manufactured from an unevenly boiled bean juice in the manufacture of a soybean curd, the curding agent is concentrated at the portion of the soybean milk which was obtained from the sufficiently heated portion of the bean juice before a coagulating reaction occurs to the entire soybean milk, the soybean milk is reacted to the curding agent promptly, and thus the curding agent cannot be uniformly mixed with the entire soybean milk. As a result, there is a problem that a soybean curd of high quality having elasticity and a sufficient water keeping property cannot be still more manufactured.

Further, the problem of the uneven boiling of beans is not limited to the case in which bean juice is manufactured and it arises when ordinary foodstuffs such as grains and the like are added with water and boiled. In particular, a problem arises when beans are boiled unevenly. F or example, unevenly boiled adzuki beans cause a problem in the manufacture of powder bean jam of high quality.

Incident ally, since steam is obtained by simply heating ordinary water in the conventional bean-juice-manufacturing caldron, it cannot be avoided for air to be mixed with the steam when it is manufactured so that oxygen is contained in the steam. When a raw material of the bean juice is boiled with the steam in which the oxygen is mixed, it is also mixed with or dissolved in soybean milk obtained by separating an solid soybean curd lees from bean juice. Thus, there is a problem that bacteria and so forth are propagated in the soybean milk, the soybean milk is deteriorated in a very short period of time and a soybean curd of high quality cannot be manufactured from the soybean milk as well as a lot of porosities are formed in the soybean curd due co the dissolved oxygen and the taste thereof becomes deterigated. To cope with this problem, a fresh soybean milk must be used at once for the manufacture of a soybean curd. Thus, a soybean curd of high quality is manufactured only by a speciality manufacturers and it is impossible to supply a fresh soybean curd to homes and eating houses.

Further, soybean milk is an excellent drink which does not cause atopic dermatitis and allergy symptoms different from a cow's milk regardless of that it is as nutritious as the cow's milk and less expensive. However, a fresh soybean milk manufactured from the conventional bean-juice-manufacturing caldron cannot be stored for a long time unless it is sterilized at high temperature. However, when the soybean milk is sterilized at high temperature, it is somewhat denatured and the deliciousness characteristic to the soybean milk is lost. Consequently, there is also a problem that a fresh soybean milk having deliciousness and a good taste is sold only in the vicinity of a small-scaled speciality soybean curd manufacturers in a very small quantity and cannot be freely distributed in a market.

A main subject of the present invention is to solve the problems of the conventional technique and to provide a caldron capable of manufacturing a boiled raw material of high quality such as bean juice, boiled adzuki beans and the like by preventing a water-added raw material to be boiled such as a raw material of bean juice, adzuki beans immersed in water or a heated ones of the adzuki beans from being unevenly boiled, by eliminating an adverse affect caused by the steam remaining in the caldron, by lowering the pressure in a caldron main body in a range higher than atmospheric pressure and preferably reducing the pressure in a range lower than it, by properly controlling the raw material fed in the caldron main body, and by evenly and sufficiently heating the raw material with the heat of the steam which are uniformly and sufficiently transmitted thereto.

Another subject of the present invention is to provide, in addition to the above subject, a caldron capable of manufacturing a boiled raw material such as bean juice and the like in and with which no oxygen is dissolved and mixed by supplying superheated steam containing substantially no oxygen when the boiled raw material such as the bean juice and the like is manufactured, and, as a result, capable of obtaining a liquid separated from the boiled raw material such as soybean milk and the like in and with which no oxygen is dissolved and mixed and which can be stored for a long period of time.

DISCLOSURE OF THE INVENTION

In order to solve the subjects described above, the present invention provides a caldron comprising: a cylindrical caldron main body having a raw material charge port disposed near to an end thereof for charging a raw material to be boiled to which water is added and a discharge port disposed near to the other end thereof for discharging the boiled one of the raw material with both the ends closed; and at least one steam injection pipe disposed in the caldron main body and having a plurality of steam injection ports disposed along a lengthwise direction of the caldron main body for injecting steam with which the raw material is boiled, wherein the injecting direction of the steam is inclined so that the steam injected from the steam injection ports are supplied in a circumferential direction of the caldron main body.

In this case, it is preferable that the caldron main body is installed vertically while disposing a side of the raw material charge port downward and a side of discharge port upward.

Moreover, the present invention provides a caldron which, in the caldron descried above, further comprises an deflector disposed near to the steam injection ports for changing a flow direction of the steam injected therefrom so that they are supplied in the circumferential direction.

In this case, it is preferable that the plurality of steam injection ports of the steam injection pipe incline a direction in which the steam is injected therefrom in the same direction so that the steam is supplied in the same circumferential direction of the caldron main body.

Preferably, a direction in which steam is injected from a portion of the plurality of steam injection ports of the steam injection pipe and a direction in which steam is injected from the remaining portion thereof are inclined in directions opposite to each other so that the steam is supplied in opposite directions.

Preferably, the directions in which the steam is injected from the plurality of the steam injection ports of the steam injection pipe are inclined in the directions opposite to each other so that the steam is supplied in the directions opposite to each other on the side of the raw material charge port and on the side of the discharge port.

Preferably, the plurality of steam injection ports of the steam injection pipe are disposed on the same straight line extending in the lengthwise direction thereof.

Moreover, the present invention provides a caldron which, in the caldron described above, further comprises at least one orifice plate disposed in the caldron main body upstream of the steam injection pipe for restricting flow of the boiled raw material and the remaining steam in the caldron main body.

Here, it is preferable that the orifice plate has orifices in the vicinity of an inner peripheral portion of the caldron main body for causing the boiled raw material and the remaining steam in the caldron main body to come into contact with the inner peripheral portion thereof as well as for preventing the remaining steam from being directly discharged.

Moreover, the present invention provides a caldron which, in the caldron described above, further comprises a cooling means disposed on the side of the discharge port of the caldron main body for cooling the boiled raw material and the remaining steam therein.

Here, it is preferable that the cooling means is a water-cooled jacket disposed to an outer periphery of the caldron main body for circulating cooling water.

Preferably, the orifice plate is disposed near to a downstream side end of a position where the cooling means is disposed or between the cooling means and the steam injection pipe in the caldron main body and has the orifices formed at the vicinity of the inter peripheral portion of the caldron main body for causing the boiled raw material and the remaining steam in the caldron main body to come into contact with the inner peripheral portion thereof as well as for preventing the remaining steam from being directly discharged.

Moreover, the present invention provides a caldron, in the caldron described above, further comprises a steam generation means for generating steam which is supplied to the steam injection ports.

Here, it is preferable that the steam generation means has an oxygen removing means Preferably, the steam is superheated steam which contains substantially no oxygen.

Preferably, the raw material is composed of a mixture of beans or ground ones thereof and water, or heated one of the mixture.

Preferably, the raw material is ground soybeans immersed in water, a mixture of the ground soybeans and water or a heated one of the mixture.

Preferably, the raw material is a mixture of adzuki beans or ground adzuki beans and water, or a heated one of the mixture.

BEST MODE OF CARRYING OUT THE INVENTION

A caldron according to the present invention will be described below in detail with reference to preferable embodiments shown in the accompanying drawings.

Figure 1:
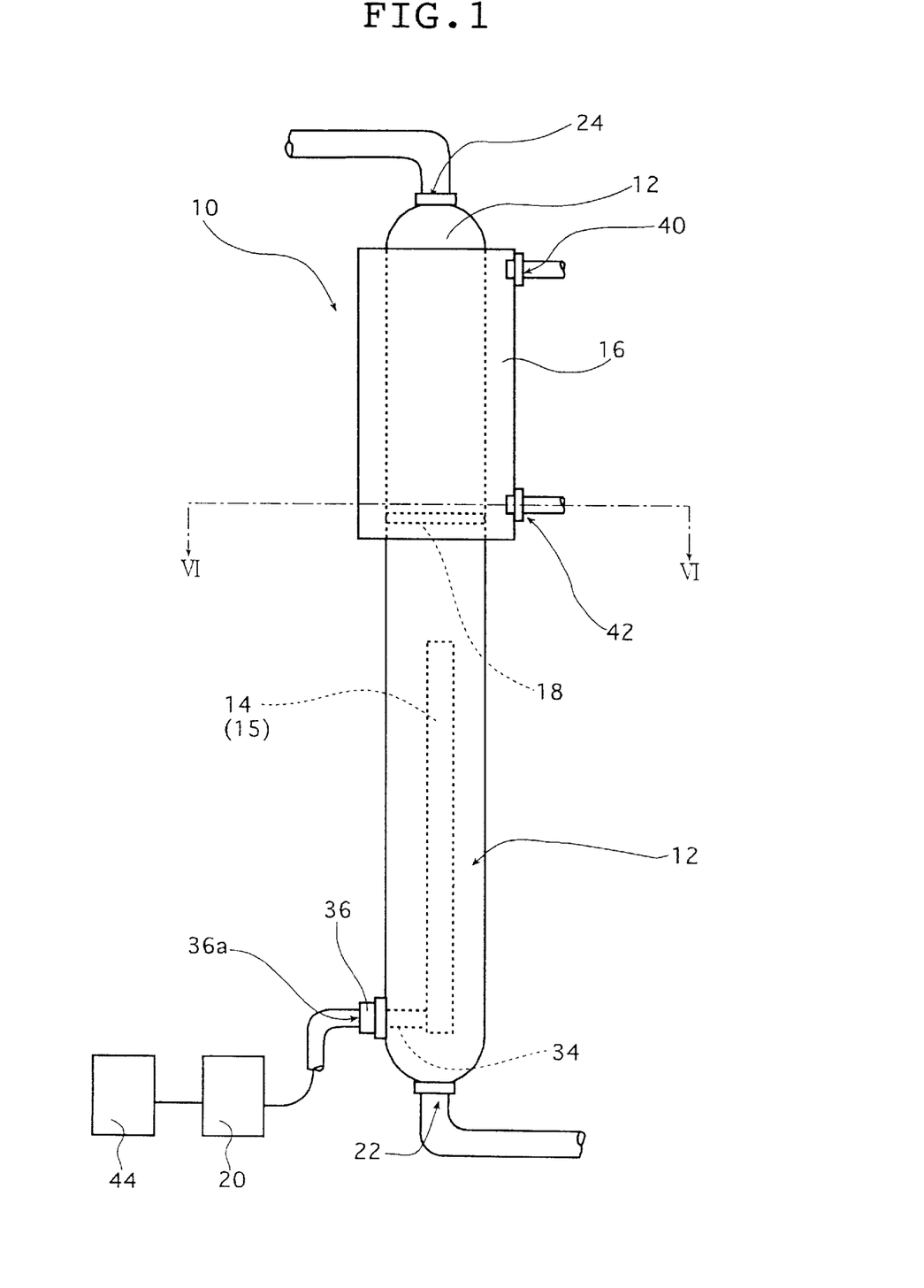
FIG. 1 is a front elevational view of an embodiment of a caldron according to the present invention.

FIG. 1 is a front elevational view of an embodiment of the bean-juice-manufacturing caldron applying the caldron of the present invention to the bean-juice-manufacturing. A bean-juice-manufacturing caldron installed vertically will be described here as a typical example of the caldron of the present invention, the bean-juice-manufacturing caldron of the present invention is not limited thereto.

The bean-juice-manufacturing caldron 10 shown in FIG. 1 comprises a cylindrical caldron main body 12 installed vertically, a steam injection pipe 14 (or 15) installed upright in the caldron main body 12 at the lower central portion thereof, an annular water-cooling jacket 16 as a cooling means disposed around the outer periphery of the caldron main body 12 at the upper portion thereof, an orifice plate 18 disposed in the caldron main body 12 between the steam injection pipe 14 (or 15) and the water-cooling jacket 16 and a steam generation means 20 disposed externally of the caldron main body 12 for supplying superheated steam into the steam injection pipe 14 (or 15).

The bean-juice-manufacturing caldron 10 shown in FIG. 1 is arranged such that various kinds of steam injection pipes can be replaceablly installed thereto. For example, the steam injection pipe 14 having a structure shown in FIG. 4 and the steam injection pipe 15 shown in FIG. 8 which will be described later, and other steam injection pipes having a structure other than the above can be replaceablly used for various applications such as main boiling, additional boiling and other boiling.

Figure 2:
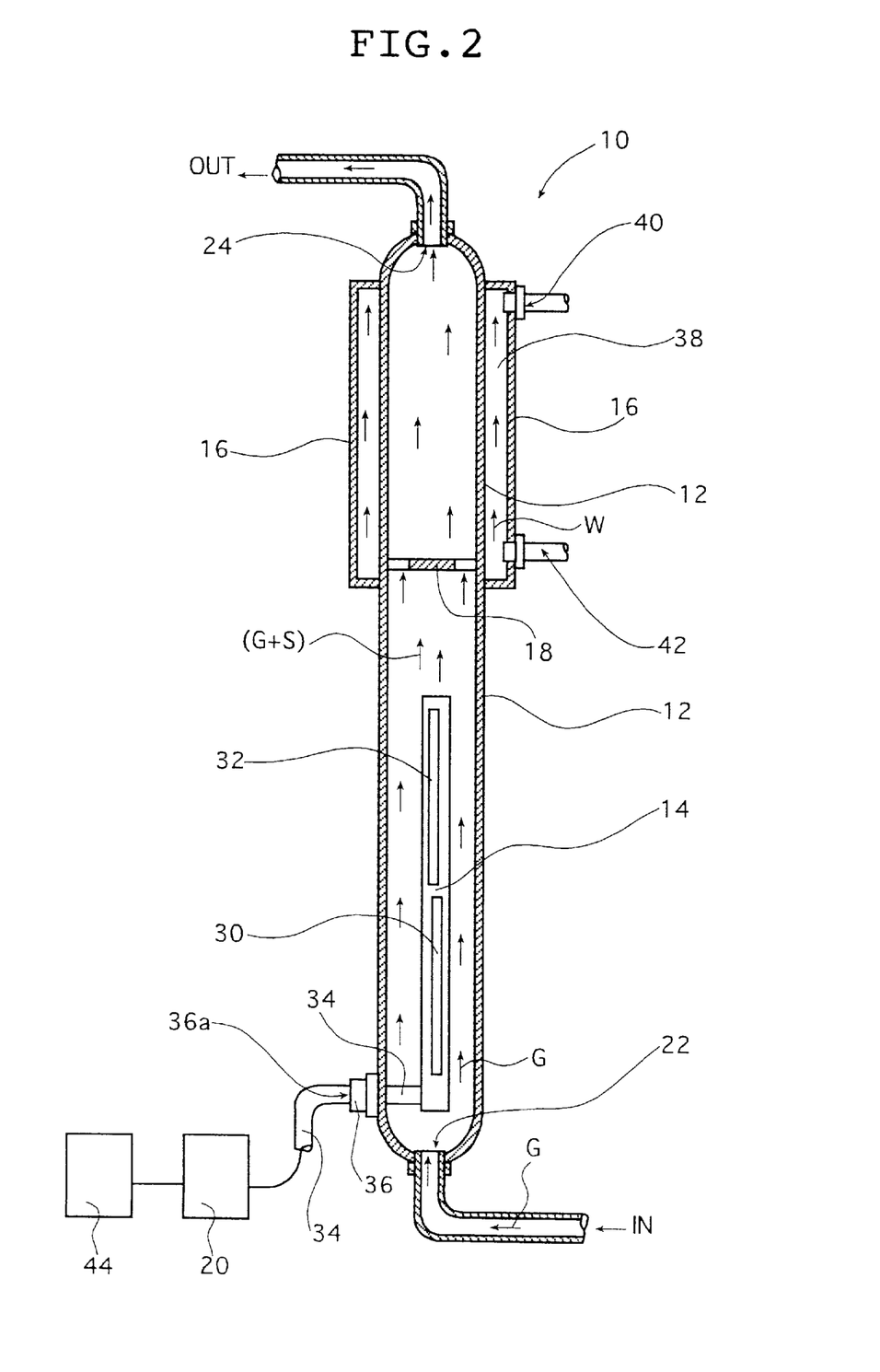
FIG. 2 is a longitudinal sectional view of the caldron shown in FIG. 1.
Figure 3:
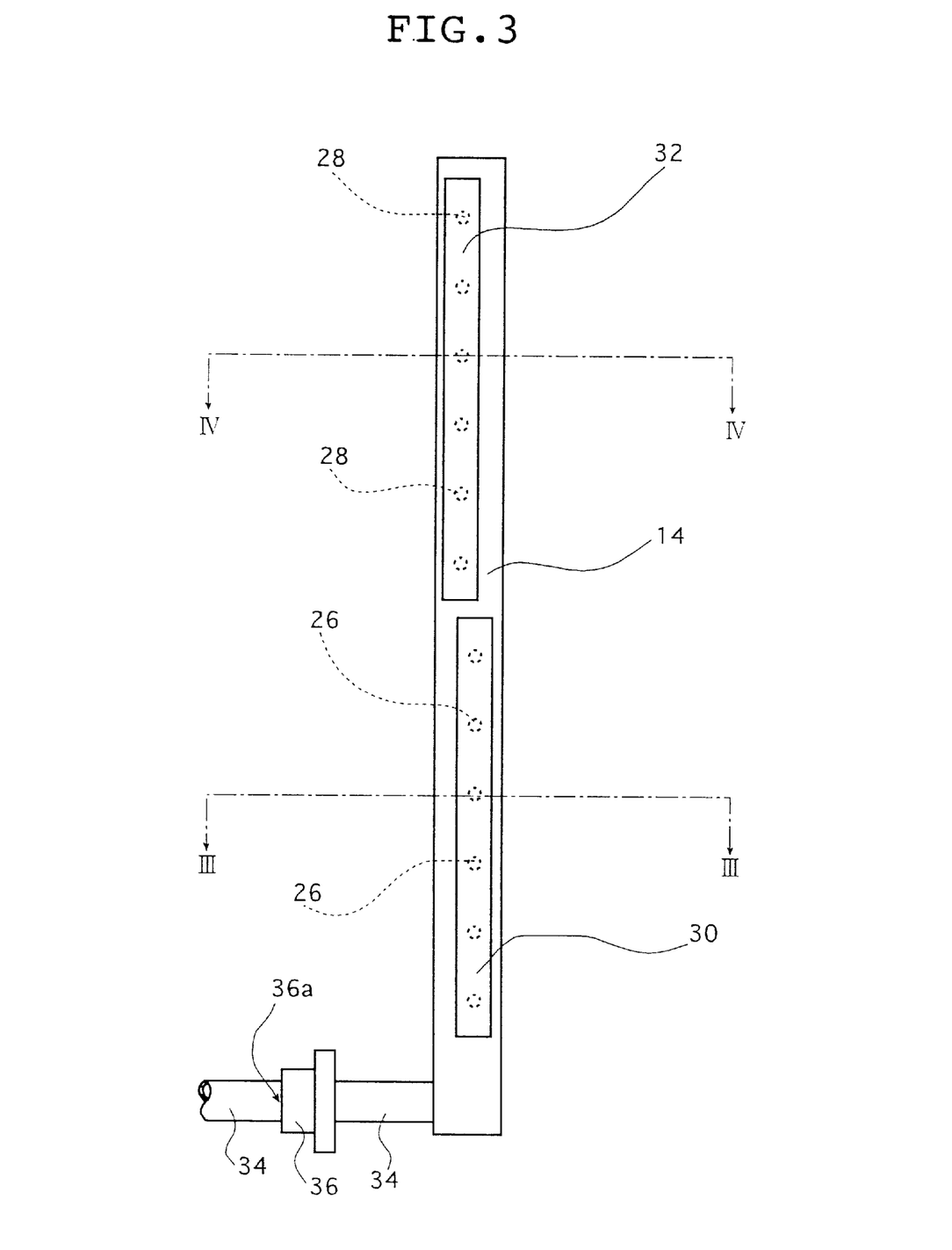
FIG. 3 is a front elevational view of a steam injection pipe used in the caldron shown in FIG. 2.

First, the bean-juice-manufacturing caldron 10 shown in FIG. 2 to which the steam injection pipe 14 shown in FIG. 3 is applied will be described below.

FIG. 2 is a longitudinal sectional view of the bean-juice-manufacturing caldron 10 shown in FIG. 1.

In FIG. 1 and FIG. 2, the caldron main body 12 boils a raw material G of bean juice and the heated material thereof (which are hereinafter generically referred to by the term "material of bean juice") with the steam S injected from the steam injection pipe 14 (refer to FIG. 4 and FIG. 5). The caldron main body 12 is composed of a cylindrical stainless steel pipe with both the ends thereof formed to a semi-spherical shape and closed and has a charge port 22 disposed to the semi-spherical bottom portion thereof and a discharge port 24 disposed to the semi-spherical top portion thereof. The material of bean juice is charged through the charge port 22. In the caldron main body 12, after the raw material G of bean juice is boiled with the steam S injected from the steam injection pipe 14, the steam S is cooled by the water-cooling jacket 16 in the upper portion of the caldron main body 12 and liquefied and condensed so that the pressure thereof is reduced. As described above, the steam injected in a circumferential direction from the steam injection pipe 14 and fluidizes the raw material G of bean juice in the lower portion of the caldron main body 12 and then the steam is cooled and condensed in the upper portion of the caldron main body 12, so the continuously charged raw material G of bean juice is fluidized from the lower charge port 22 to the upper discharge port 24 while being boiled so that it smoothly move upward spirally. Thus, the bean juice, which has been sufficiently and uniformly boiled, can be successively and smoothly discharged from the discharge port 24.

The steam injection pipe 14 injects superheated steam into the caldron main body 12 to boil the raw material G of bean juice charged through the charge port 22 in the caldron main body 12 and to move it in the circumferential direction in the caldron main body 12, that is, to move upward it spirally therein. In the illustrated example, the steam injection pipe 14 is composed of a stainless steel pipe installed upright in the caldron main body 12 from the bottom to a central portion thereof. As shown in FIG. 3, the upper end of the steam injection pipe 14 is closed and a plurality of injection ports 26 and 28 are formed along each of the same straight lines extending in the vertical direction of the steam injection pipe 14.

Figure 4:
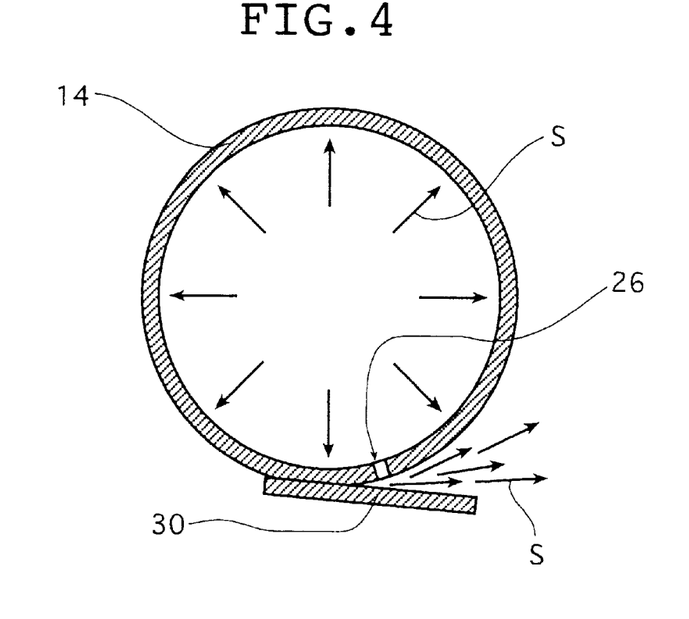
FIG. 4 is a sectional view of a steam injection pipe taken along the line III—III shown in FIG. 3.
Figure 5:
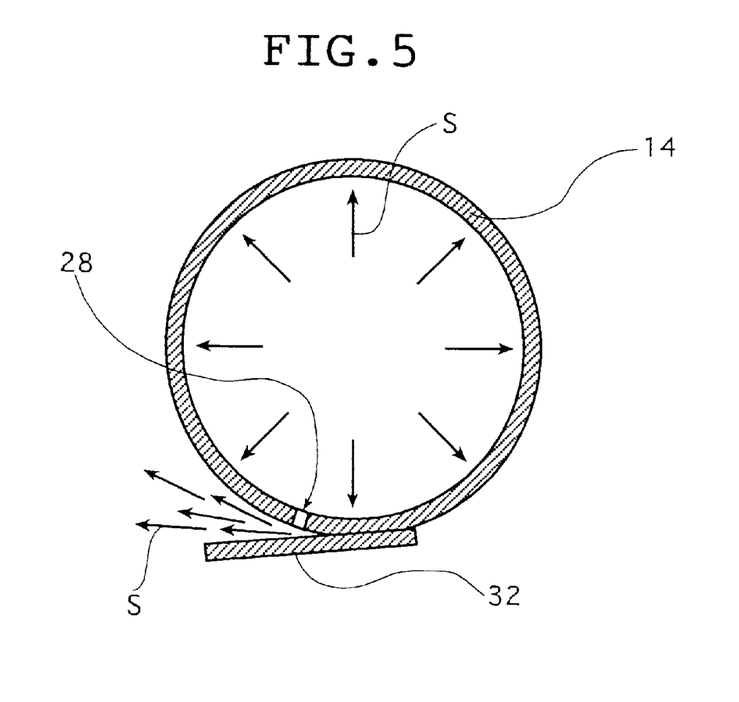
FIG. 5 is a sectional view of the steam injection pipe taken along the line IV—IV shown in FIG. 3.

As shown in FIG. 4, a lower deflector 30 is mounted in the vicinity of the lower injection ports 26 of the steam injection pipe 14 on the left side thereof for changing the direction of the steam S injected from the injection ports 26 so that they are directed from a radial direction to a direction inclined rightward in the figure, for example, so that they are directed rightwards in a tangential direction. The lower deflector 30 is mounted to the steam injection pipe 14 with the left side portion thereof attached to the steam injection pipe 14 in the vicinity of the left side of the lower injection ports 26 in the figure such that it covers the lower injection ports 26 obliquely, that is, in a tangential direction in the illustrated example at a position near to them. In contrast, as shown in FIG. 5, an upper deflector 32 is mounted to the stream injection pipe 14 in the vicinity of the right side of the upper injection ports 28 of the steam injection pipe 14 on the right side thereof so as to cover the upper injection ports 28 obliquely, that is, in a tangential direction in the illustrated example at a position near to them. As a result, the upper deflector 32 deflects the steam S injected from the upper injection ports 28 so that the direction thereof is deflected from a radial direction to a direction inclined leftwards so that it is directed, for example, leftwards in a tangential direction.

As described above, the lower deflector 30 and the upper deflector 32, which are mounted on the steam injection pipe 14 in an opposite direction, permits the steam from the injection ports 26 and 28, which are located at the upper half portion and the lower half portion of the steam injection pipe 14, to be injected in opposite circumferential directions. As a result, in the caldron 10 of the illustrated example, the steam S injected from the upper injection ports 28 of the steam injection pipe 14 can be caused to come into contact with the raw material G of bean juice sufficiently and uniformly and the heat of the steam can be sufficiently transmitted thereto, whereby the raw material G of bean juice is uniformly and sufficiently boiled. Therefore, since all the steam S reaching the upper portion of the caldron main body 12 sufficiently lower their temperature and a part or all of the steam S can be liquefied and condensed, steam S, which remain residually at high temperature while keeping a sufficient quantity of heat capable of boiling the raw material G of bean juice, can be almost eliminated.

Further, as shown in FIGS. 1, 2 and 3, the lower end of the steam injection pipe 14 is also closed, and a steam supply pipe 34 is connected perpendicular to the steam injection pipe 14 in the vicinity of the lower end thereof. The steam supply pipe 34 is fixed to a mounting section 36 with a steam supply port 36a located at a lower portion of the caldron main body 12 so as to extend to the outside through the caldron main body 12. The steam supply pipe 34 extending to the outside of the caldron main body 12 is connected to the steam generation means 20 such as a boiler or the like for generating superheated steam.

The water-cooling jacket 16 is disposed around the outer peripheral wall of the caldron main body 12 at the upper portion thereof, formed to an annular shape and has closed upper and lower end portions. The interior of the water-cooling jacket 16 is arranged as an annular cooling chamber 38 which can be filled with a cooling water. Further, a cooling water discharge port 40 and a cooling water charge port 42 are disposed to the water-cooling jacket 16 on the upper and lower sides thereof, respectively. With this arrangement, the water-cooling jacket 16 sufficiently liquefies and condenses the steam S whose temperature is lowered through the function thereof for sufficiently boiling the raw material G of bean juice and making it to bean juice, to thereby lower the pressure of the upper portion of the caldron main body 12 and preferably to provide a pressure in reduced state in the upper portion thereof.

The provision of the-water-cooling jacket 16 can sufficiently liquefy and condense the steam reaching the upper portion of the caldron main body 12 and having lowered temperature. In addition, even if high temperature remaining steam reach the upper portion of the caldron main body 12, it can be sufficiently cooled, liquefied and condensed by the water-cooling jacket 16. Thus, such an adverse effect of high temperature remaining steam, which arises in a conventional caldron, can be eliminated that it stays in the upper portion of the caldron main body 12 as it is, increases the pressure of the upper portion thereof, and pushes out the raw material of bean juice into the discharge port 24 of the caldron main body 12 in a quantity larger than necessary, thereby making it impossible to properly control the feed of the raw material of bean juice.

Figure 6:
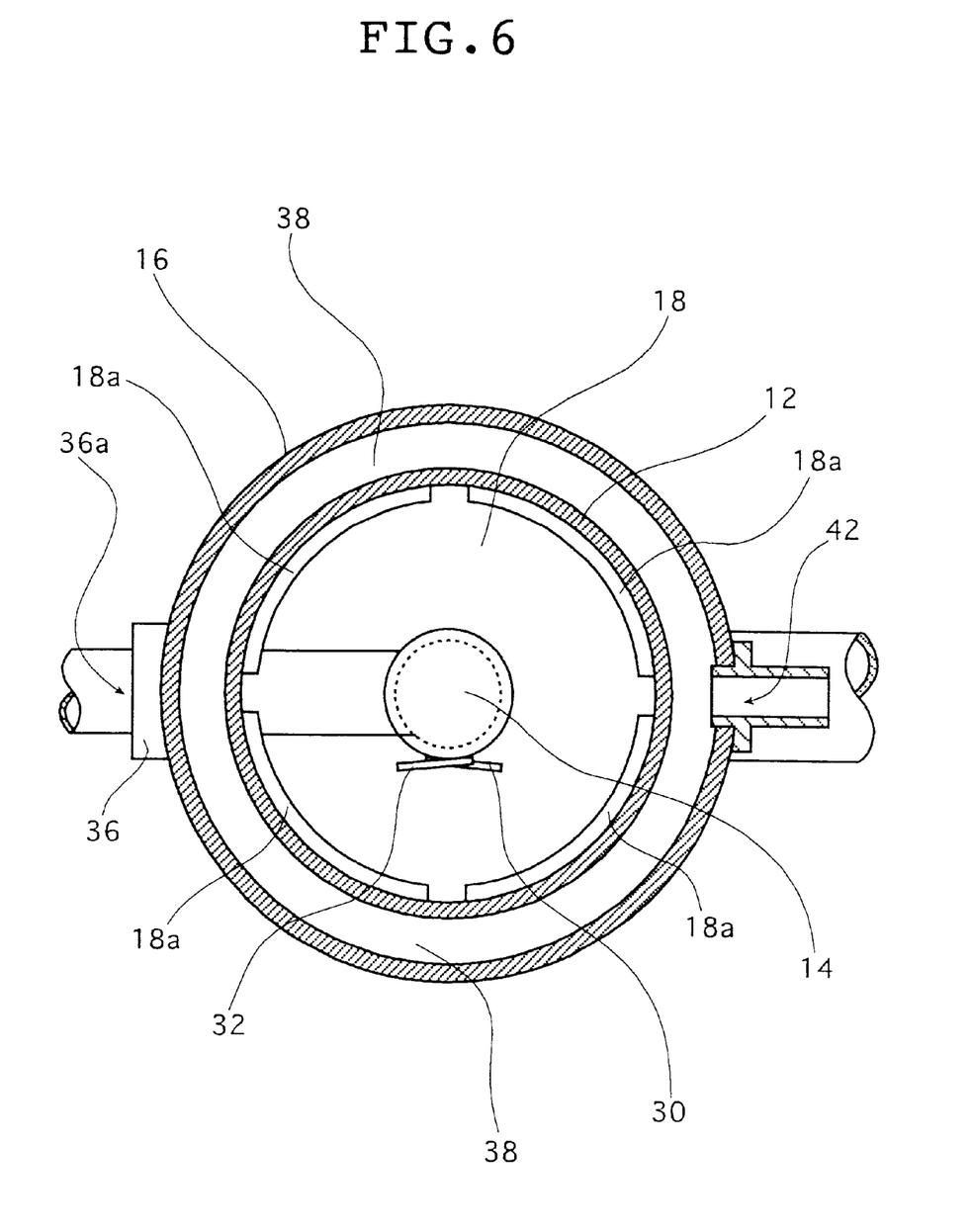
FIG. 6 is a sectional view of the caldron taken along the line VI—VI shown in FIG. 1.

The orifice plate 18 prevents the steam reaching the upper portion of the caldron main body 12 with their temperature lowered from being directly discharged through the discharge port 24 so that they can be sufficiently cooled with the water-cooling jacket 16 by being stayed in the caldron main body 12. Thus, the orifice plate 18 sufficiently liquefies and condenses the steam with their temperature lowered as well as the remaining steam as well as causes the bean juice to come into contact with the inner wall surface, which is cooled with the water-cooling jacket 16, of the caldron main body 12 at the upper portion thereof, thereby effectively cooling them. The orifice plate 18 is disposed in the vicinity of the lower end of the water-cooling jacket 16 mounted to the upper portion of the caldron main body 12, and has four orifices (openings) 18a formed around the periphery thereof in the illustrated example.

With this arrangement, even if remaining steam having a quantity of heat capable of boiling the raw material G of bean juice reach the upper portion of the caldron main body 12 and stay therein while keeping their high temperature, in addition to steam with their temperature lowered, the remaining steam and the boiled bean juice are dammed out by the orifice plate 18 together, stay below the orifice plate 18 for a predetermined time and are sufficiently cooled with the water-cooling jacket 16. As a result, almost all or preferably all the steam is liquefied and condensed even if the remaining steam exists. In contrast, the upward movement of the boiled bean juice is prevented by the orifice plate 18 and passes through the orifices 18a on the periphery of the orifice plate 18. As a result, the bean juice passed through the orifices 18a is forcibly caused to contact with the cooling inner wall surface of the caldron main body 12 at the upper portion thereof so that it is not only cooled efficiently but also unliquefied steam, even if they are contained in the bean juice, are instantly liquefied and condensed. Therefore, the steam in the caldron main body 12 are not directly discharged through the discharge port 24.

The steam generation means 20 is used to generate superheated steam which will be supplied to the steam injection pipe 14 installed in the caldron main body 12 and is not particularly limited. Thus, a conventionally known boiler and the like may be used. However, it is preferable that the steam generation means 20 includes an oxygen removing means 44 for making the superheated steam to be supplied to the steam injection pipe 14 to superheated steam which contains no oxygen substantially.

In the present invention, the provision of the oxygen removing means 44 with the steam generation means 20 permits superheated steam which contains no oxygen substantially to be supplied to the steam injection pipe 14 and to be injected into the caldron main body 12 through the plurality of injection ports 26 and 28. The raw material G of bean juice in the caldron main body 12 can be thereby boiled with the superheated steam which contains no oxygen substantially that it can be boiled with superheated steam which contains no oxygen substantially so as not to be oxidized. Therefore, the quantity of the oxygen dissolved in the liquid component of the thus obtained bean juice can the minimized. As a result, since no oxygen is substantially dissolved in the soybean milk obtained by separating a solid matter (solid soybean curd lees) from the thus obtained bean juice and the propagation of the bacteria in the soybean milk is prevented, the soybean milk can be stored in a fresh state for a period of time greatly longer than a conventional soybean milk.

In the present invention, the oxygen removing means 44 provided with the steam generation means 20 is not particularly limited thereto. That is, employed as the oxygen removing means 44 may be a means for reducing pressure so that air and oxygen is not mixed into, for example, the steam generating unit of the steam generation means 20 as well as a means for reducing in advance the pressure of the water to be supplied to the steam generating unit of the steam generation means 20 or heating the water while reducing the pressure thereof so as to remove the oxygen dissolved therein, a means for removing the oxygen dissolved in water to be supplied to the steam generating unit by adding an oxygen removing agent to the water, and any other conventionally known oxygen removing means. In addition, any conventionally known oxygen removing methods may be employed.

The cooking caldron of the present invention is basically arranged as described above. Operation of the caldron of the present invention will be described with reference to the bean-juice-manufacturing caldron shown in FIG. 1 to FIG. 6.

First, when superheated steam containing no sustained content of oxygen is supplied from the steam generation means 20 into the steam injection pipe 14, the steam injected from the injection ports 26 in an radial direction is deflected by the lower deflector 30 counterclockwise in a circumferential direction in the caldron main body 12 in the lower portion of the steam injection pipe 14 so that the steam flow round backward of the injection ports 26. In contrast, the steam injected from the injection ports 28 in an radial direction is deflected by the upper deflector 32 clockwise in a circumferential direction in the caldron main body 12 in the upper portion of the steam injection pipe 14 so that the steam flow round backward of the injection ports 28.

At the time, when a raw material of bean juice is supplied by a feed pump (not shown) or the like through the charge port 22 located at the lower portion of the caldron main body 12, the raw material of bean juice in the vicinity of the lower portion of the steam injection pipe 14 is moved counterclockwise in a circumferential direction by the steam, which are injected from the plurality of injection ports 26 and 28 of the steam injection pipe 14 and deflected rightward in the figure by the lower deflector 30. In contrast, the raw material of bean juice in the vicinity of the upper portion of the steam injection pipe 14 is moved clockwise in a circumferential direction by the steam deflected leftward in the figure by the upper deflector 32. The raw material of bean juice, which is not in contact with the previously injected steam, is successively moved to the portion of the caldron main body 12 where new steam is injected from the injection ports 26 and 28 and comes into contact with the new steam having high thermal energy and high motion energy. In this manner, since the steam moves upward in the caldron main body 12 spirally, they stay in the caldron main body 12 for a long time while being in uniform contact with the raw material of bean juice. At the same time, in the vicinity of the intermediate portion of the steam injection pipe 14 between the upper portion and the lower portion thereof, the raw material of bean juice moves along a convection current which has opposite directions between the upper portion and the lower portion of the steam injection pipe 14.

The raw material of bean juice moving counterclockwise in the lower portion of the steam injection pipe 14 in the caldron main body 12 is moved upward by a not shown feed pump or the like and made to a complex turbulent flow with its turning direction reversed clockwise, whereby the steam is further more in good contact with raw material of bean juice. With this operation, the heat of the steam is uniformly and sufficiently transmitted to the raw material of bean juice. Thus, the steam is robbed of their heat thereby and liquefied and condensed from a gas so that the volume thereof is reduced, by which the pressure in the caldron main body 12 is lowered. As a result, the raw material of bean juice is not pushed out through the discharge port 24 by the pressure in the caldron main body 12 in a quantity larger than necessary to ensure that it is heated so as not to be cooked unevenly.

Subsequently, in the upper portion of the caldron main body 12, since the upward movement of the boiled bean juice and remaining steam (steam keeping their high temperature may be contained in low temperature steam) is prevented by the orifice plate 18, they stay temporarily at their locations so that the liquefaction and condensation of the remaining steam is promoted. In contrast, the remaining steam stayed by the orifice plate 18 is forcibly cooled with the cooling water flowing in the annular cooling chamber 38 of the water-cooling jacket 16 and liquefied and condensed from a gas to thereby reduce their volume, by which the pressure in the upper portion of the caldron main body 12 is lowered. In contrast, the bean juice passing through the orifices 18a on the periphery of the orifice plate 18 is effectively cooled because it is caused to come into forcible contact with the inner wall surface of the caldron main body 12 which is cooled with the annular cooling chamber 38 of the water-cooling jacket 16. Thus, the bean juice is not pushed out through the discharge port 24 by the pressure of the remaining steam in the caldron main body 12 in a quantity larger than necessary.

The thus obtained bean juice is bean juice whose quality is greatly higher than that of a conventional bean juice because it is not unevenly cooked by being uniformly and sufficiently boiled with the superheated steam containing substantially no oxygen, is not oxidized, and contains substantially no dissolved oxygen. The separation of a solid soybean curd lees from the bean juice of high quality results in the very fresh soybean milk in which concentration of the soybean protein is higher than that in a conventional soybean milk and in which substantially no oxygen is dissolved. Since the thus obtained soybean milk substantially contains no dissolved oxygen, it can suppress a period of time during which the freshness thereof can be maintained can be greatly extended as compared with that of the conventional soybean milk. Thus, the deterioration of the taste and deliciousness of the soybean milk can be prevented for a longer period of time as compared with that of the conventional soybean milk, whereby the soybean milk of the present invention can be stored longer than the conventional soybean milk.

The steam injection pipe 14 shown in FIG. 3 is provided with the two deflectors 30 and 32 for deflecting the flowing directions of the steam, which are injected from the respective injection ports 26 and 28 located at the lower portion and the upper portion of the steam injection pipe 14, in an opposite direction circumferentially, respectively. However, the present invention is not limited thereto and the steam injected from the steam injection pipe may flow in any direction and any means for regulating the flowing direction of the steam may be employed.

For example, the flowing direction of the steam injected from the plurality of steam injection ports may be deflected in the same direction circumferentially by one deflector or may be deflected in an opposite direction circumferentially using three or more deflectors, respectively. The positions where the plurality of steam injection ports are formed in correspondence to one deflector or to each of two or more deflectors are not limited to the positions on the same straight line with respect to each of the deflectors. That is, the steam injection ports may be formed on the same straight line with respect to all of the deflectors, may be formed by dislocating their positions by a predetermined angle, for example, 90° or 180° in the circumferential direction of the steam injection pipe with respect to each of the deflectors or to each injection port. Further, the steam injection ports may be disposed at equal intervals or absolutely at random. It is needless to say that each of deflectors may be provided with each of the injection ports regardless of that steam injected therefrom flows in same direction or not, or one deflector may be provided with a plurality of injection ports from which steam is injected in the same direction. A deflector used here is not limited to the flat deflector of the illustrated example and a deflector which is partly or entirely curved in the circumferential direction of the caldron main body 12 may be used. A direction in which steam is flown by the deflector is not limited to a circumferential direction precisely and it may be inclined upward or downward. While it is preferable to provide deflectors with all the injection ports, some of the injection ports may not be provided with a deflector. The direction of the holes of the injection ports formed to the steam injection pipe is not limited to the radial direction and may be inclined. Further, the number and size of the injection port formed to one steam injection pipe is not particularly limited and may be suitably selected in accordance with the characteristics of the caldron.

Figure 7:
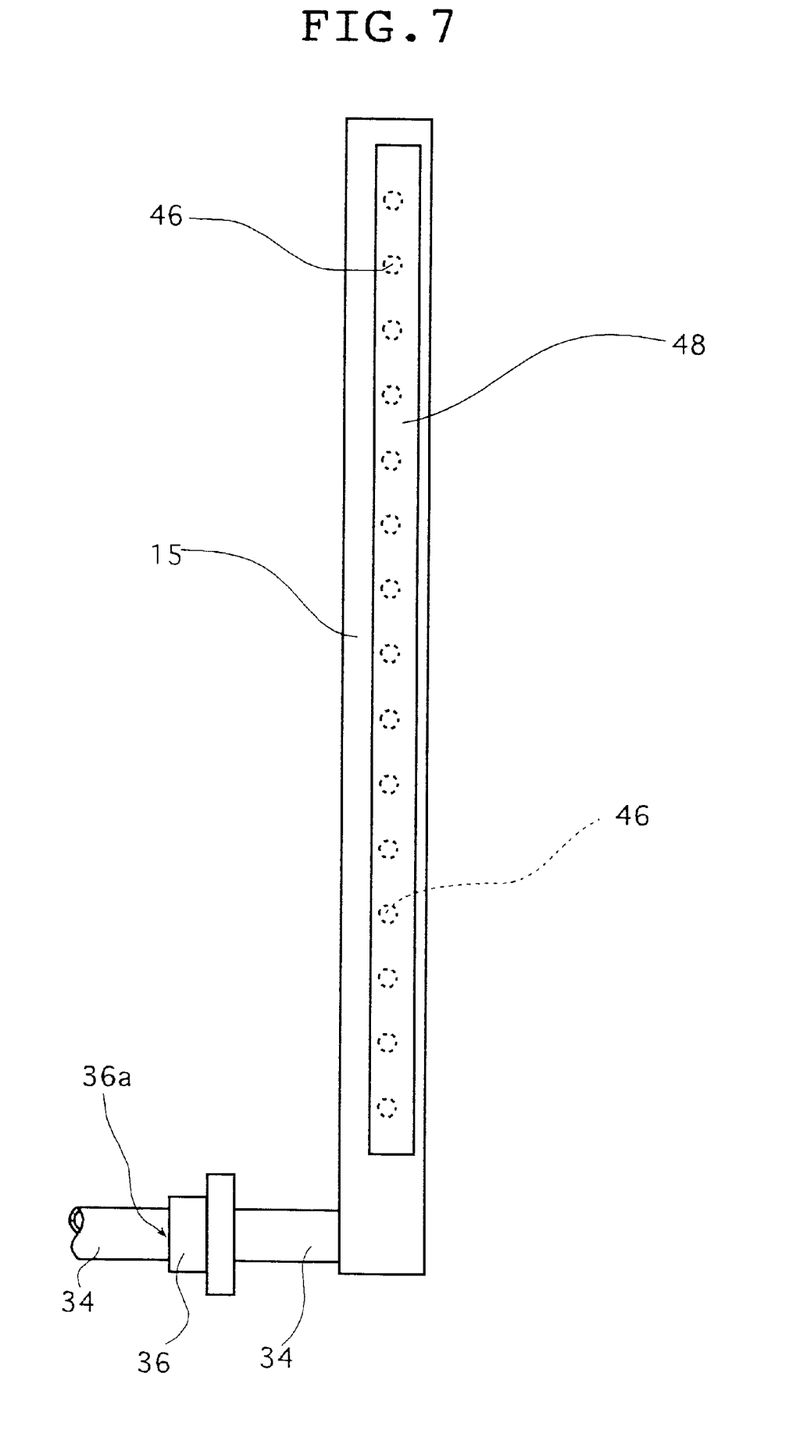
FIG. 7 is a front elevational view of another embodiment of the steam injection pipe used in the caldron shown in FIG. 1.

FIG. 7 shows the steam injection pipe 15 with one deflector which is used in the caldron 10 shown in FIG. 1. The steam injection pipe 15 has a plurality injection ports 46 formed on the same straight line extending in an vertical direction. The deflector 48 is mounted obliquely on the steam injection pipe 15 near to the injection ports 46 on the left side thereof in the Figure, that is, the steam injection pipe 15 is-mounted so as to cover the injection ports 46 in a tangential line in the illustrated example.

In the embodiment shown in FIG. 7, the deflector 48 deflects the steam injected from the injection ports 46 so that they flow in a direction which is inclined rightwards in the Figure from a radial direction, for example, rightwards in a tangential direction. As a result, the steam injected from the injection ports 46 are deflected by the deflector 48 in the direction which is inclined rightwards in the figure from the radial direction and flow counterclockwise in a circumferential direction in the caldron main body 12.

When the raw material of bean juice is supplied by the feed pump or the like through the charge port 22 located at the lower portion of the caldron main body 12, at the time the steam injection pipe 15 shown in FIG. 7 is installed in place of the steam injection pipe 14 shown in FIG. 2, the steam, which are injected and deflected by the deflector 48, move the raw material of bean juice, which is located in the vicinity of the steam injection pipe 15 in the upper and lower portions thereof, counterclockwise in the circumferential direction and move upward spirally in the caldron main body 12 together with the raw material of bean juice. As a result, the steam comes into even contact with the raw material of bean juice, stay in the caldron main body 12 for a longer time, and the heat of them is uniformly and sufficiently transmitted to the raw material of bean juice. Thus, the steam loses its energy and is liquefied from a gas and condensed, thereby reducing their volume and lowering the pressure in the caldron main body 12 as described above. As a result, since it is suppressed that the raw material of bean juice is pushed out through the discharge port 24 by the pressure in the caldron main body 12 in a quantity larger than necessary, it is heated so as not to be unevenly boiled.

In the steam injection pipe 15 arranged as described above, the mixing of the steam with the raw material of bean juice and the fluidization and stir of the raw material of bean juice by the steam is gently performed as compared those strongly performed by the turbulent flow of the steam in the steam injection pipe 14 shown in FIG. 2. Thus, the bean-juice-manufacturing caldron 10 provided with the steam injection pipe 14 shown in FIG. 2 is preferably used in main boiling, whereas the bean-juice-manufacturing caldron 10 provided with the steam injection pipe 15 shown in FIG. 7 is preferably used in additional boiling.

However, the present invention is not limited thereto and the steam injection pipe 14 may be used in the additional boiling and the steam injection pipe 15 may be used in the main boiling.

In the bean-juice-manufacturing caldron 10 of the illustrated example, the deflectors 3C, 32 and 46, which are obliquely mounted in the vicinity of the injection ports 26, 28 and 46 of the steam injection pipe 14 and 15, are used as a means for inclining the directions in which the steam from the injection ports are injected. However, the present invention is not limited thereto and any means may be used so long as it can make the injecting direction of the steam to the circumferential direction in the caldron main body 12. For example, the injection ports may be covered with caps to make the injecting direction of the steam to the circumferential direction in the caldron main body 12, nozzles may be attached to the injection ports, or a thick member is used for the steam injection pipe and an injection pipe may be obliquely drilled to form ports.

As described above, while the steam from the injection ports 26, 28 and 46 of the steam injection pipes 14 and 15 are injected in the circumferential direction in the caldron main body 12, the injecting direction is not restrictive. That is, the injecting direction may be any one of a clockwise direction and a counterclockwise direction, may be deflected from a clockwise direction to a counterclockwise direction and vice versa for each of the injection ports or at intervals of a few injection ports, or may be set absolutely at random.

In the bean-juice-manufacturing caldron 10 of the illustrated example, the single steam injection pipe 14 or 15 is used as the steam injection pipe. However, the present invention is not limited thereto and two or more steam injection pipes may be used. In addition, while it is preferable that the steam injection pipe used in the present invention be formed to the cylindrical shape of the illustrated example, it is not limited thereto and an elliptic cross sectional pipe, a square cross sectional pipe, a modified cross sectional pipe and the like my be used. Further, the size of the steam injection pipe is not particularly limited.

In the bean-juice-manufacturing caldron 10 of the illustrated example, while the water-cooling jacket 16 disposed at the upper portion of the caldron main body 12 is used as the cooling means, the present invention is not limited thereto and a cooling means itself may not be provided or even if a cooling means is provided, a conventionally known cooling means may be used. For example, a pipe or pipes may be spirally wound around the upper portion of the caldron main body 12 and cool water such as well water or the like may be supplied thereto by a pump. Further, a cooling medium to be used in the cooling means is not limited to cool water and any conventionally known refrigerant may be used.

In the bean-juice-manufacturing caldron 10 of the illustrated example, while the single orifice plate 18 having the orifices 18a formed around the periphery thereof is mounted as an orifice plate for temporality staying steam and bean juice, the present invention is not limited thereto. That is, an orifice plate may not be used at all or two or more orifice plates may be used. Further, the positions where the respective orifices of the orifice plates are formed, the number, size and shape of the orifices are not particularly limited and they may be suitably determined in accordance with the capability, characteristics and like of the caldron.

In the bean-juice-manufacturing caldron 10 of the illustrated example, while the steam generation means 20 including the oxygen removing means 44 is used as the steam generation means 20 for generating the superheated steam which is supplied to the steam injection pipe 14, the present invention is not limited thereto. That is, when the boiled beans such as the boiled bean juice for manufacturing the soybean milk which need not be stored for a long period of time and the boiled azuki beans for manufacturing the powder bean jam, is produced, the oxygen removing means 44 need not be necessarily provided and a conventionally known boiler and the like which are not provided with the oxygen removing means 44 may be used as the steam generation means 20. It is needless to say that when soybean milk which can be stored for a long period of time in a fresh state is manufactured, the steam generation means 20 must be provided with the oxygen removing means 44.

In the bean-juice-manufacturing caldron 10 of the illustrated example, while the four or more similar bean-juice-manufacturing caldrons 10 are ordinarily used by being connected to each other in series, the caldron of the present invention may be used in combination with other differently-constructed caldron.

In the illustrated example, the bean-juice-manufacturing caldron applying the manufacture of the bean juice has been described here as a typical example of the caldron of the present invention, subjects of a boil with the caldron of the present invention is not limited to the bean juice, bean soup and so forth. Otherwise, the caldron of the present invention may be applicable to the manufacture of the boiled azuki beans for manufacturing the powder bean jam and the manufacture of the other boiled beans, further applicable to the boil of grains and the boil of grained or lumpy foods and so forth.

Operation of the Invention

In the caldron of the present invention, the steam, which are supplied from the steam injection ports (hereafter, also referred to as injection ports) in the circumferential direction of the caldron main body, turningly flow backward of the injection ports therein and come into contact with a water-added material to be boiled (hereinafter, simply referred to as raw material) in -he vicinity of the steam injection ports such as a raw material of bean juice, adzuki beans immersed in water or heated ones of the adzuki beans, sufficiently transmit the heat thereof thereto and then flow downstream in the caldron main body, that is, when the caldron main body is installed vertically, the steam flow upward. Accordingly, since the steam stays in the caldron main body for a long time while coming into uniform and sufficient contact with the raw material, the steam transmits the heat thereof to a large amount of the water-added raw material to be boiled and lower the temperature thereof. As a result, the steam is liquefied, made to water and reduce the volume thereof, and thus act to reduce the steam remaining in the lower portion of the caldron main body and to lower the pressure of the caldron main body in the upper portion thereof. Thus, an adverse affect caused by remaining steam is eliminated.

In the caldron in which a steam injecting direction is inclined in the same direction so that the steam injected from the respective injection ports of the steam injection pipe are supplied in the same circumferential direction of the caldron main body, the steam, which are injected from the injection ports of the steam injection pipe in the circumferential direction of the caldron main body, turningly flow backward of the injection ports in the caldron main body, come into contact with the raw material such as the bean juice in the vicinity thereof, sufficiently transmit the heat thereof thereto as well as move the raw material located in the circumferential direction thereof in that direction. Therefore, the raw material, which is located at a position furthest from the injection ports along the injecting direction of the steam to which the steam is difficult to turningly flow and which is not in sufficient contact therewith, successively moves to the vicinity of the injection ports from which the steam in the steam injection pipe are injected into the caldron main body and comes into contact with the steam having both high thermal energy and high motion energy just after they are injected from the injection ports. With this operation, the heat of the steam is effectively transmitted to the raw material located in the circumferential direction of the injection ports of the steam, whereby the raw material can be more uniformly and sufficiently heated.

Since the raw material moves in the circumferential direction as well as is pushed upward from the lower side thereof in the caldron main body, the steam in the caldron main body move upward spirally therein so that they stay in the caldron main body for a long time while coming into contact with a larger amount of the raw material. Thus, the steam evenly transmits the heat thereof to the raw material, are made to water by being liquefied and condensed, thereby reducing the volume thereof and lowering the pressure thereof. With this operation, since the steam acts to reduce the streams remaining in the upper portion of the caldron main body and to lower the pressure in the caldron main body in the upper portion thereof, the adverse affect caused by the remaining streams can be eliminated.

In the caldron in which the respective injecting directions of the steam, which are injected from the injection ports in the circumferential direction of the caldron main body, are inclined in the directions opposite to each other in the lower portion and the upper portion of the steam injection pipe, the steam, which are supplied in the circumferential direction of the caldron main body from the respective injection ports in the lower portion and the upper portion of the steam injection pipe, turningly flow backward of the injection ports in the caldron main body in the circumferential directions opposite to each other in the upper portion and the lower portion of the steam injection pipe; come into contact with the raw material in the vicinity of the injection ports and sufficiently transmit the heat thereof thereto; as well as move the raw material located in the circumferential direction thereof in the circumferential directions opposite to each other in the upper portion and the lower portion of the steam injection pipe. Therefore, the raw material, which is located at a position furthest from the injection ports along the injecting direction of the steam to which the steam is difficult to turningly flow and which is not in sufficient contact therewith, successively moves to the vicinity of the injection ports from which the steam in the steam injection pipe are injected into the caldron main body and comes into contact with the steam having both high thermal energy and high motion energy just after they are injected from the injection ports. With this operation, the heat of the steam is effectively transmitted to the raw material located in the circumferential direction of the injection ports of the steam, whereby the raw material can be more uniformly and sufficiently heated.

Since the raw material moves in the circumferential direction as well as is pushed upward from the lower side thereof in the caldron main body, the steam in the caldron main body move upward spirally therein so that they stay in the caldron main body for a long time while coming into contact with a larger amount of the raw material. Thus, the steam evenly transmits the heat thereof to the raw material, are made to water by being liquefied and condensed, thereby reducing the volume thereof and lowering the pressure thereof. With this operation, since the steam acts to reduce the streams remaining in the upper portion of the caldron main body and to lower the pressure in the caldron main body in the upper portion thereof, the adverse affect caused by the remaining streams can be eliminated. At the time, since the raw material is made to a convection flow which moves in the circumferential directions opposite to each other in the upper portion and the lower portion of the steam injection pipe, the steam and the raw material, which are located in the vicinity of the intermediate portion of the steam injection pipe in the caldron main body between the upper portion and the lower portion thereof, are stirred in a complex turbulent flow and come into better contact with each other. With this operation, the steam can sufficiently and more effectively transmit the heat thereof to the raw material.

As described above, in the caldron of the present invention, the heat of the steam is uniformly and sufficiently transmitted to a large amount of the raw material. Thus, the steam is changed from a gas state to a liquid state by being liquefied and condensed through the transmission of the heat thereof to the raw material so that the volume thereof is reduced. As a result, the steam can suppress the raw material from being pushed out to the discharge port of the caldron main body in a quantity larger than necessary by greatly reducing the remaining steam, which stay in the upper portion of the caldron main body, and by lowering the pressure in the caldron main body in the upper portion thereof.

In the caldron having the cooling means in the upper portion of the caldron main body for cooling the raw material and the steam in the caldron main body, the steam, which are mixed with the raw material located in the upper portion of the caldron main body and the remaining steam, which stay in the upper portion of the caldron main body, are forcibly cooled with the cooling means, reduce the volume thereof by being liquefied and condensed, and lower the pressure of the upper portion of the caldron main body. As a result, the steam can suppress the raw material from being pushed out to the discharge port of the caldron main body in a quantity larger than necessary.

In the caldron having the orifice plate in the upper portion of the steam injection pipe, in particular, in the vicinity of the cooling means of the caldron main body, since the orifice plate can cause the boiled raw material and the steam moved upward up to the upper portion of the caldron main body to temporarily stay in the upper portion. As a result, the boiled raw material can be effectively cooled and the steam (including the remaining steam) can be more effectively liquefied and condensed.

Further, in the caldron having the oxygen removing means provided with the steam generation means for generating superheated steam which is supplied to the steam injection pipe, since the superheated steam, which contains substantially no oxygen can be injected from the plurality of injection ports of the steam injection pipe to the raw material in the caldron main body, the oxidation of the resulting boiled raw material can be prevented and the oxygen dissolved in the boiled raw material can be minimized. Therefore, when the thus obtained boiled raw material is bean juice, the oxygen dissolved in soybean milk, which is obtained by separating a solid matter such a solid soybean curd lees and the like from the bean juice, can be substantially eliminated. As a result, there can be obtained soybean milk whose freshness can be maintained at a concentration higher than that of conventional soybean milk and which can be stored for a long period of time.

Industrial Applicability

As described above in detail, according to the present invention, the direction, in which steam is injected from the plurality of injection ports disposed in the direction of both the ends of the steam injection pipe installed in the cylindrical caldron main body, is inclined so that the steam is supplied in the circumferential direction of the caldron main body. Since the steam injected from the injection ports are thereby evenly mixed with the water-added raw material to be boiled such as bean juice and the like, the heat of the steam can be uniformly and sufficiently transmitted to the raw material to be boiled; the temperature of the steam itself can be lowered so that the steam is liquefied and condensed from a gas state, thereby reducing the volume thereof; and the pressure in the caldron main body can be lowered. As a result, since it can be suppressed that the raw material to be boiled is pushed out to the discharge port in a quantity larger than necessary, the raw material to be boiled, which is fed in the caldron main body, can be properly controlled and a boiled raw material such as bean juice and the like of high quality can be manufactured without being unevenly boiled.

In the present invention, when the injecting direction of the steam injected from the respective injection ports of the steam injection pipe into the caldron main body is inclined in the same circumferential direction, the steam injected from the injection ports fluidizes the raw material to be boiled in the caldron main body in the circumferential direction. Further, the steam successively moves the raw material to be boiled, which is located backward of the injection ports and which is least mixed with and least comes into contact with the steam, to the portion to which the steam is injected in the vicinity of the injection ports, whereby the raw material comes into contact with the steam having high thermal energy and high motion energy just after they are injected. Accordingly, the heat of the steam can be more uniformly, more sufficiently and effectively transmitted to the raw material to be boiled; the temperature of the steam is sufficiently lowered so that the steam is sufficiently liquefied and condensed from a gas, thereby reducing the volume thereof; and the pressure in the caldron main body can be lowered, in addition to the above effect. As a result, the discharge of the raw material to the discharge port in a quantity larger than necessary can be well suppressed, and the raw material fed in the caldron main body can be more properly controlled, whereby the boiled raw material such as bean juice and the like of higher quality can be manufactured without being unevenly boiled.

In the present invention, when the injecting directions of the stream injected from the respective injection ports of the steam injection pipe into the caldron main body are inclined in the same circumferential directions opposite to each other on both the sides thereof, the steam is mixed with the raw material to be boiled and the raw material is fluidized and stirred by the steam in a complex turbulent flow in the vicinity of the intermediate region of the caldron main body. Accordingly, the heat of the steam is effectively transmitted to the raw material more uniformly and sufficiently so that the lowering of the temperature of the steam and the liquefaction and condensation of thereof, the pressure reduction in the caldron main body, the suppression of the raw material discharged to the discharge port in a quantity larger than necessary and the proper control of the raw material fed in the caldron main body can be more effectively performed, whereby the boiled raw material of higher quality can be manufactured without being less unevenly boiled, in addition to the above effects.

In the present invention, when the deflector is obliquely disposed at the position near to -the respective injection ports of the steam injection pipe to deflect the steam injected therefrom radially to the circumferential direction, the caldron can be provided at a less expensive price because the cost of the material of the deflector is less expensive and the deflector can be easily mounted on the steam injection pipe.

In the present invention, when at least one of the cooling means, which cools the raw material to be boiled and the remaining steam in the caldron main body, and the orifice plate, which temporarily stays them therein, is disposed to the discharged port side of the caldron main body, the following effects can be achieved, in addition to the above effects. That is, the remaining steam can be prevented from being directly discharged through the discharge port, the lowering of the steam temperature and the liquefaction and condensation of the steam is promoted, and the lowering of the pressure in the caldron main body, the suppression of discharge of the raw material to the discharge port in a quantity larger than necessary and the proper control of the raw material fed in the caldron main body can be more effectively performed In addition, -the boiled raw material of high quality can be manufactured without being unevenly boiled. Note that when both of the cooling means and the orifice plate are provided in the present invention, it is needless to say that the above effect is more remarkable.

In the present invention, when the oxygen removing means is provided with the steam generation means for generating superheated steam for boiling the raw material to be boiled in the caldron main body, the boiled raw material of very high quality can be manufactured without being unevenly boiled which substantially contains neither an oxidized, boiled raw material such as oxidized bean juice and the like nor dissolved oxygen, in addition to the above effects. The separated liquid such as the soybean milk and the like which is obtained by separating the solid matter from the boiled raw material such as bean juice can be stored for a long period of time without the deterioration of the freshness thereof.

When the bean juice of high quality, which is manufactured by means of the caldron of the present invention without being unevenly boiled, is used to manufacture a soybean curd, since the soybean milk manufactured from the bean juice can delay the condensing reaction thereof performed by a curding agent, the soybean milk can be mixed well with the curding agent before the occurrence of the condensing reaction, whereby the elastic soybean curd having a good water keeping property can be manufactured.

Further, when bean juice of high quality, which is not unevenly boiled and contains substantially no dissolved oxygen is, obtained by being boiled with steam substantially containing no dissolved oxygen using the caldron having the steam generation means provided with the oxygen removing means, and then soybean milk is manufactured from the thus obtained bean juice, the bacteria do not propagate in the soybean milk, the freshness of the soybean milk is less deteriorated and the soybean milk can be stored a long period of time, in addition to the above effects. In addition, the soybean curd manufactured from the soybean milk has no porosity caused by dissolved oxygen and can be made to a tasteful soybean curd whose deliciousness and smell are not deteriorated.

While the caldron according to the present has been described above in detail with reference to the various embodiments, the present invention is by no means limited to the above embodiments and it goes without saying that various improvements and design modifications can be made within the range which does not depart from the gist of the invention.

We claim:

1. A caldron comprising:
    a cylindrical caldron main body having a raw material charge port disposed near to an end thereof for charging a raw material to be boiled to which water is added and a discharge port disposed near to the other end thereof for discharging the boiled one of the raw material with both the ends closed; and
    at least one steam injection pipe disposed in the caldron main body and having a plurality of steam injection ports disposed along a lengthwise direction of the caldron main body for injecting steam with which the raw material is boiled,
    wherein the injecting direction of the steam is inclined so that the steam injected from the steam injection ports are supplied in a circumferential direction of the caldron main body.

2. A caldron according to claim 1, wherein the caldron main body is installed vertically while disposing a side of the raw material charge port downward and a side of the discharge port upward.

3. A caldron according to claim 2, further comprising an deflector disposed near to the steam injection ports for changing a flow direction of the steam injected therefrom so that they are supplied in the circumferential direction.

4. A caldron according to claim 1, wherein the plurality of steam injection ports of the steam injection pipe incline a direction in which the steam is injected therefrom in the same direction so that the steam is supplied in the same circumferential direction of the caldron main body.

5. A caldron according to claim 1, wherein a direction in which steam is injected from a portion of the plurality of steam injection ports of the steam injection pipe and a direction in which steam is injected from the remaining portion thereof are inclined in directions opposite to each other so that the steam is supplied in opposite directions.

6. A caldron according to claim 5, wherein the directions in which the steam is injected from the plurality of the steam injection ports of the steam injection pipe are inclined in the directions opposite to each other so that the steam is supplied in the directions opposite to each other on the side of the raw material charge port and on the side of the discharge port.

7. A caldron according to claim 1, wherein the plurality of steam injection ports of the steam injection pipe are disposed on the same straight line extending in the lengthwise direction thereof.

8. A caldron according to claim 1, further comprising at least one orifice plate disposed in the caldron main body upstream of the steam injection pipe for restricting flow of the boiled raw material and the remaining steam in the caldron main body.

9. A caldron according to claim 8, wherein the orifice plate has orifices in the vicinity of an inner peripheral portion of the caldron main body for causing the boiled raw material and the remaining steam in the caldron main body to come into contact with the inner peripheral portion thereof as well as for preventing the remaining steam from being directly discharged.

10. A caldron according to claim 1, further comprising a cooling means disposed on the side of the discharge port of the caldron main body for cooling the boiled raw material and the remaining steam therein.

11. A caldron according to claim 10, wherein the cooling means is a water-cooled jacket disposed to an outer periphery of the caldron main body for circulating cooling water.

12. A caldron according to claim 11, wherein the orifice plate is disposed near to a downstream side end of a position where the cooling means is disposed or between the cooling means and the steam injection pipe in the caldron main body and has the orifices formed at the vicinity of the inter peripheral portion of the caldron main body for causing the boiled raw material and the remaining steam in the caldron main body to come into contact with the inner peripheral portion thereof as well as for preventing the remaining steam from being directly discharged.

13. A caldron according to claim 1, further comprising a steam generation means for generating steam which is supplied to the steam injection ports.

14. A caldron according to claim 13, wherein the steam generation means has an oxygen removing means.

15. A caldron according to claim 1, wherein the steam is superheated steam which contains substantially no oxygen.

16. A caldron according to claim 1, wherein the raw material is composed of a mixture of beans or ground ones thereof and water, or heated one of the mixture.

17. A caldron according to claim 1, wherein the raw material is ground soybeans immersed in water, a mixture of the ground soybeans and water or a heated one of the mixture.

18. A caldron according to claim 1, wherein the raw material is a mixture of adzuki beans or ground adzuki beans and water, or a heated one of the mixture.

* * * * *